(12) United States Patent
Miao

(10) Patent No.: US 11,936,762 B2
(45) Date of Patent: Mar. 19, 2024

(54) PROCESSING PROTOCOL PACKET

(71) Applicant: New H3C Technologies Co., Ltd., Zhejiang (CN)

(72) Inventor: Chen Miao, Beijing (CN)

(73) Assignee: NEW H3C TECHNOLOGIES CO., LTD., Zhejiang (CN)

(*) Notice: Subject to any disclaimer, the term of this patent is extended or adjusted under 35 U.S.C. 154(b) by 410 days.

(21) Appl. No.: 17/413,926

(22) PCT Filed: Dec. 17, 2019

(86) PCT No.: PCT/CN2019/125962
§ 371 (c)(1),
(2) Date: Jun. 14, 2021

(87) PCT Pub. No.: WO2020/125624
PCT Pub. Date: Jun. 25, 2020

(65) Prior Publication Data
US 2022/0094768 A1 Mar. 24, 2022

(30) Foreign Application Priority Data
Dec. 18, 2018 (CN) .......................... 201811551764.4

(51) Int. Cl.
*H04L 69/18* (2022.01)
*H04L 45/24* (2022.01)
*H04L 67/10* (2022.01)

(52) U.S. Cl.
CPC ............ *H04L 69/18* (2013.01); *H04L 45/245* (2013.01); *H04L 67/10* (2013.01)

(58) Field of Classification Search
None
See application file for complete search history.

(56) References Cited

U.S. PATENT DOCUMENTS 10,635,547 B2 * 4/2020 Padia .................. G06F 11/1464
2012/0287937 A1 * 11/2012 Kaya ...................... H04L 45/28
370/401

(Continued)

FOREIGN PATENT DOCUMENTS

CN 101534231 A 9/2009
CN 102752187 A 10/2012

(Continued)

OTHER PUBLICATIONS

ISA State Intellectual Property Office of the People's Republic of China, International Search Report Issued in Application No. PCT/CN2019/125962, dated Mar. 19, 2020, WIPO, 4 pages.

(Continued)

*Primary Examiner* — Phirin Sam
(74) *Attorney, Agent, or Firm* — McCoy Russell LLP

(57) ABSTRACT

The present disclosure provides a method and apparatus for processing a protocol packet. The method includes: when a first member device of a distributed relay (DR) system receives a first protocol packet through a first DR interface, the first member device performs protocol processing based on the first DR interface and the first protocol packet; and the first member device sends, to a second member device of the DR system, a first type packet comprising an interface identifier of the first DR interface and the first protocol packet, so that the second member device determines that the first protocol packet is received through a second DR interface corresponding to the interface identifier, and performs protocol processing based on the second DR interface and the first protocol packet.

16 Claims, 3 Drawing Sheets

---

201
Upon receiving first protocol packet through first DR interface, performing protocol processing based on first DR interface and first protocol packet 202
Sending first type packet to second member device, where first type packet may comprise interface ID of first DR interface and first protocol packet, so that second member device determines that first protocol packet is received through second DR interface corresponding to the interface ID, and performs protocol processing based on second DR interface and first protocol packet

(56) References Cited

U.S. PATENT DOCUMENTS

| | | | |
|---|---|---|---|
| 2015/0124837 A1 | 5/2015 | Saltsidis et al. | |
| 2015/0288620 A1* | 10/2015 | Yasuda | H04L 49/25 |
| | | | 370/401 |
| 2015/0333954 A1* | 11/2015 | Yasuda | H04L 12/46 |
| | | | 370/227 |
| 2016/0065407 A1 | 3/2016 | Saltsidis | |
| 2016/0105324 A1 | 4/2016 | Ao et al. | |
| 2017/0054591 A1* | 2/2017 | Hyoudou | H04L 45/583 |
| 2018/0337849 A1* | 11/2018 | Sharma | H04L 65/1069 |
| 2020/0169546 A1* | 5/2020 | Padmanabhan | H04L 9/3236 |
| 2020/0213221 A1* | 7/2020 | Sharma | H04L 41/122 |

FOREIGN PATENT DOCUMENTS

| | | |
|---|---|---|
| CN | 103023686 A | 4/2013 |
| CN | 103501250 A | 1/2014 |
| CN | 103873336 A | 6/2014 |
| CN | 104125088 A | 10/2014 |
| CN | 104660508 A | 5/2015 |
| CN | 106878164 A | 6/2017 |
| CN | 107547243 A | 1/2018 |
| CN | 107547398 A | 1/2018 |
| CN | 107547412 A | 1/2018 |
| CN | 108259635 A | 7/2018 |
| JP | 2015515809 A | 5/2015 |
| JP | 2017183873 A | 10/2017 |
| WO | 2016030864 A1 | 3/2016 |

OTHER PUBLICATIONS

State Intellectual Property Office of the People's Republic of China, Office Action and Search Report Issued in Application No. 201811551764.4, dated Jun. 30, 2020, 10 pages. (Submitted with Machine Translation).
Japanese Patent Office Action, Office Action Issued in Application No. 2021-532217, dated Jul. 5, 2022, 6 pages. (Submitted with Machine Translation).
ISA State Intellectual Property Office of the People's Republic of China, Written Opinion of the International Searching Authority Issued in Application No. PCT/CN2019/125962, dated Mar. 19, 2020, WIPO, 9 pages.
European Patent Office, Extended European Search Report Issued in Application No. 19899658.9, dated Nov. 19, 2021, Germany, 10 pages.

* cited by examiner

PROCESSING PROTOCOL PACKET

CROSS REFERENCE TO RELATED APPLICATIONS

The present application is a U.S. National Phase of International Application No. PCT/CN2019/125962 entitled "PROCESSING PROTOCOL PACKET," and filed on Dec. 17, 2019. International Application No. PCT/CN2019/125962 claims priority to Chinese Patent Application No. 201811551764.4 filed on Dec. 18, 2018. The entire contents of each of the above-listed applications are hereby incorporated by reference for all purposes.

TECHNICAL FIELD

The present disclosure relates to the field of network communication technology, and in particular, to a method of processing a protocol packet and a member device of a distributed relay (DR) system.

BACKGROUND AND SUMMARY

Distributed Resilient Network Interconnect (DRNI) pertains to a multi-chassis link aggregation technology that may aggregate multiple network devices virtually into one network device, thereby achieving multi-chassis link aggregation and providing device-level redundancy protection and traffic load sharing. For example, network device A and network device B may be aggregated into a distributed relay (DR) system, and the DR system may act externally as one network device. In this way, network device A and network device B may share a load and perform traffic forwarding together. Moreover, when one of the network devices fails, traffic may be quickly switched to the other network device, thereby ensuring normal service operation with no service interruption.

In order to implement the multi-chassis link aggregation, it is necessary to synchronize data between network device A and network device B. For example, network device A may synchronize Address Resolution Protocol (ARP) data to network device B. Conventionally, network device A may use a private message to synchronize the ARP data to network device B. For example, the private message may carry a Media Access Control (MAC) address, an Internet Protocol (IP) address, information on an outbound interface, or the like. Upon receiving the private message, network device B may parse the MAC address, the IP address, the information on the outbound interface, or the like from the private message.

However, if network device A is upgraded in version but network device B is not upgraded in version, the software version of the private message from network device A may be inconsistent with that of a private message from network device B. Then, after network device A sends a private message to network device B, network device B may not be able to parse ARP data from the private message, resulting in abnormal link aggregation.

DETAILED DESCRIPTION

Figure 1:
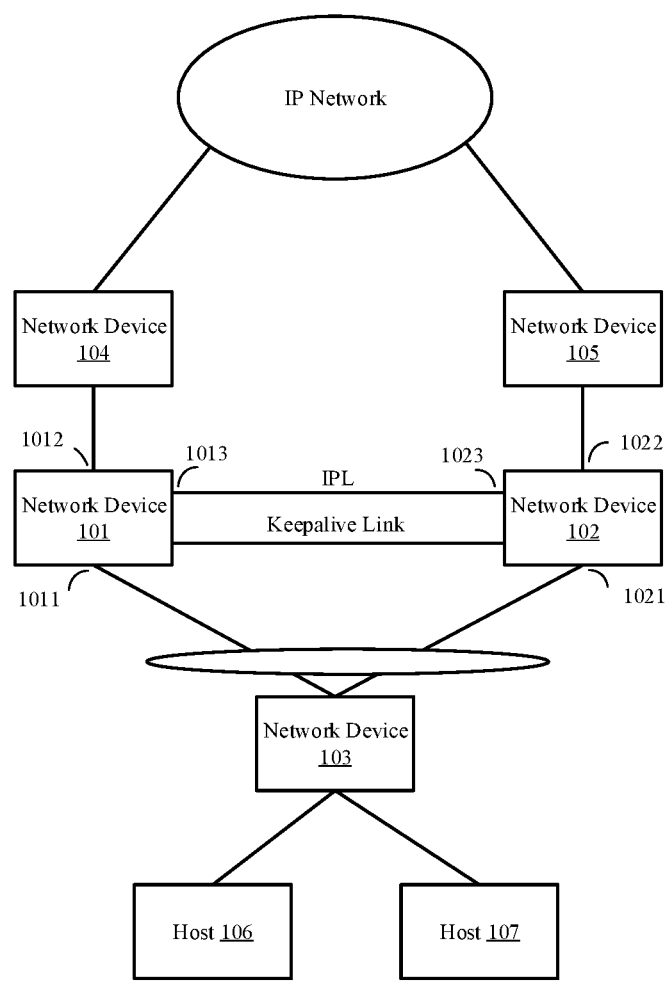
FIG. 1 schematically illustrates an environment where examples of the present disclosure may be applied.

The terms used in the present disclosure are merely for the purpose of describing particular examples, and are not intended to limit the present disclosure. The term "a", "the" or "said" in a singular form in the present disclosure and the appended claims may also comprise plurality, unless specifically otherwise indicated in the context. The term "and/or" as used herein refers to any of one or more associated listed items and all possible combinations thereof.

It should be appreciated that, although terms such as "first", "second", "third" and the like may be used in the present disclosure to describe various information, such information should not be limited by these terms. These terms are only used to distinguish the same type of information from each other. For example, without departure from the scope of the present disclosure, first information may be referred as second information and similarly second information may also be referred as first information. Depending on the context, the word "if" as used herein may be interpreted as "when", "upon" or "in response to".

An example of the present disclosure proposes a method of processing a protocol packet. The method may be applied to a DR system that comprises a plurality of member devices (also referred to as DR member devices). For convenience of description, a certain member device of the DR system may be called a first member device, and the other member devices of the DR system may be called second member devices. The number of the second member devices may be one or more. The first member device may be a master member device of the DR system, and the second member device may be a slave member device of the DR system. Alternatively, the first member device may be a slave member device of the DR system, and the second member device may be a master member device of the DR system.

Each of the first member device and the second member device has a DR interface, which is a Layer 2 aggregation interface connecting the member device of the DR system to an external device. These DR interfaces belong to the same DR group and have the same DR group identifier. For convenience of distinction, the DR interface on the first member device for connecting to an external device is referred to as a first DR interface, and the DR interface on the second member device for connecting to an external device is referred to as a second DR interface. The first DR interface and the second DR interface belong to the same DR group, and have the same identifier which is an identifier of the DR group.

There are two links between the first member device and the second member device. One link is an intra-portal link (IPL) and the other link is a keepalive link. The IPL is a Layer 2 aggregation link for transmitting a protocol packet, such as a DRNI protocol packet. The keepalive link is for transmitting a keepalive packet.

The first member device has a first intra-portal port (IPP), and the second member device has a second IPP. The first IPP is a Layer 2 aggregation interface on the first member device for connecting to the second member device, and the second IPP is a Layer 2 aggregation interface on the second member device for connecting to the first member device.

The IPL is a link between the first IPP of the first member device and the second IPP of the second member device.

FIG. 1 schematically illustrates an environment where examples of the present disclosure may be applied. In the environment, a network device 101 and a network device 102 are aggregated into a DR system through an Ethernet link. The DR system may act externally as one network device and is connected to a network device 103 through an aggregated logical link (the network device 103 may be connected to a host 106 and a host 107). Of course, more network devices may be aggregated into a DR system. In the above environment, the network device 101 and the network device 102 are member devices of the DR system, wherein one is a master member device and the other is a slave member device. For example, the network device 101 may be referred to as a first member device and the network device 102 may be referred to as a second member device. Alternatively, the network device 102 may be referred to as a first member device and the network device 101 may be referred to as a second member device.

Assuming that the network device 101 is a first member device and the network device 102 is a second member device, an interface 1011 is a first DR interface, an interface 1013 is a first IPP, an interface 1021 is a second DR interface, and an interface 1023 is a second IPP. Alternatively, assuming that the network device 102 is a first member device and the network device 101 is a second member device, the interface 1011 is a second DR interface, the interface 1013 is a second IPP, the interface 1021 is a first DR interface, and the interface 1023 is a first IPP.

As shown in FIG. 1, an interface 1012 for connecting the network device 101 to a network device 104 is referred to as a non-DR interface of the network device 101. Herein, the non-DR interface refers to any interface of the member device other than the DR interface and the IPP. Similarly, an interface 1022 for connecting the network device 102 to a network device 105 is referred to as a non-DR interface of the network device 102.

Figure 2:
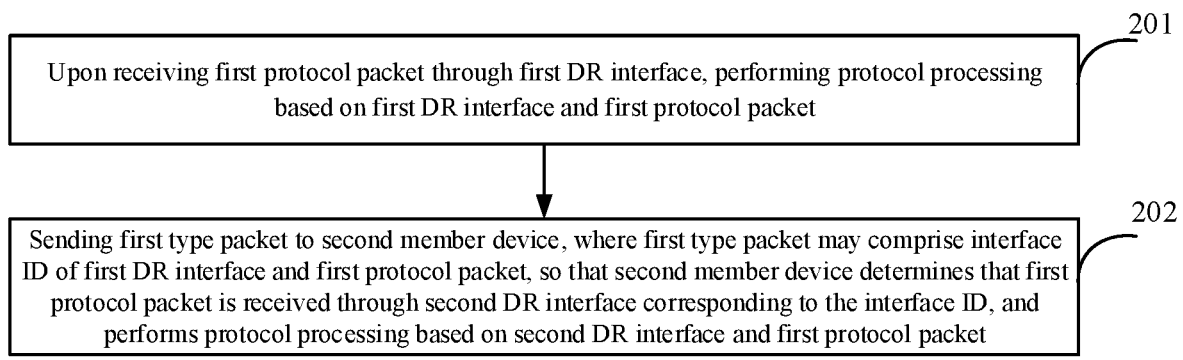
FIG. 2 is a flowchart of a method of processing a protocol packet based on an example of the present disclosure.

A method of processing a protocol packet based on an example of the present disclosure may be applied to the above environment. FIG. 2 is a flowchart of the method. The method may be performed by a first member device of a DR system, and the DR system may further comprise a second member device. As shown in FIG. 2, the method may comprise steps 201 to 202.

At step 201, if a first protocol packet is received through a first DR interface, protocol processing may be performed based on the first DR interface and the first protocol packet.

In an example of the present disclosure, a process of performing the protocol processing by the first member device is related to a protocol type of the first protocol packet. Specifically, the protocol type may comprise an entry-related protocol type and an entry-unrelated protocol type. For example, upon receiving a protocol packet of an entry-related protocol type through the first DR interface, the first member device is required to create or update a forwarding entry with the protocol packet. In contrast, upon receiving a protocol packet of an entry-unrelated protocol type through the first DR interface, the first member device is not required to create or update a forwarding entry with the protocol packet.

For example, the entry-related protocol type may involve a Generic Virtual Local Area Network Registration Protocol (GVRP), an Address Resolution Protocol (ARP), a Media Access Control (MAC) and the like. In the following description, the ARP will be taken for example. A processing for any other entry-related protocol type is similar to that for the ARP, and thus will not be repeated herein.

The entry-unrelated protocol type may involve, for example, a Spanning Tree Protocol (STP). In the following description, the STP will be taken for example. A processing for any other entry-unrelated protocol type is similar to that for the STP, and thus will not be repeated herein.

In an example, upon receiving an ARP protocol packet (such as an ARP request packet or a free ARP packet, etc.) through the first DR interface, the first member device may perform protocol processing based on the first DR interface and the ARP protocol packet. Specifically, the first member device may record, in a forwarding entry (such as a MAC entry or an ARP entry, etc.), a correspondence between a source address (such as a source MAC address and/or a source IP address) of the ARP protocol packet and an interface identifier of the first DR interface. Table 1 shows an example of the forwarding entry, where aaa denotes the interface identifier of the first DR interface and AAA denotes the source address of the ARP protocol packet. Of course, Table 1 is only an example. In practical application, the forwarding entry may further comprise other content.

TABLE 1

| Destination Address | Outbound Interface |
|---|---|
| AAA | aaa |
| ... | ... |

In an example, upon receiving an STP protocol packet (such as a Bridge Protocol Data Unit (BPDU) packet, etc.) through the first DR interface, the first member device may perform protocol processing based on the first DR interface and the STP protocol packet. Specifically, the first member device may determine, based on the STP protocol packet, a port role of the first DR interface (for example, determining whether the first DR interface is a root port, a designated port, or a blocked port, etc.). For the determining method, a conventional STP protocol processing flow may be referred to. If the first DR interface is a root port or a designated port, the first DR interface may be set to a forwarding state. If the first DR interface is a blocked port, the first DR interface may be set to a blocked state.

At step 202, a first type packet may be sent to the second member device, where the first type packet may include an interface identifier of the first DR interface and the first protocol packet which is received by the first member device through the first DR interface, so that the second member device determines that the first protocol packet is received through a second DR interface corresponding to the interface identifier, and performs protocol processing based on the second DR interface and the first protocol packet.

In an example, the first type packet may comprise a header and a packet body. The header may include the interface identifier of the first DR interface, and the packet body may include the first protocol packet. The header may be in a Type-Length-Value (TLV) format, where a Type field may include a first identifier indicating that the header carries the interface identifier of the first DR interface; a Length field may include a value of a length of the header; and a Value field may include the interface identifier of the first DR interface. The packet body may also be in a TLV format, where a Type field may include a second identifier indicating that the packet body carries a protocol packet body; a Length field may include a value of a length of the packet body; and a Value field may include the first protocol packet.

In an example, the first member device may send the first type packet to the second member device through an IPL. Specifically, the first member device and the second member device may negotiate to establish a communication channel (hereinafter referred to as RLINK) on the IPL. The first member device may send the first type packet to the second member device through the RLINK.

Upon receiving the first type packet, the second member device may obtain the interface identifier of the first DR interface and the first protocol packet from the first type packet. Since the interface identifier of the first DR interface of the first member device is the same as the interface identifier of the second DR interface of the second member device, the second member device may determine the second DR interface corresponding to the obtained interface identifier of the first DR interface. Meanwhile, the second member device may determine that the first protocol packet is received through the second DR interface. Thus, the second member device may perform protocol processing based on the second DR interface and the first protocol packet.

In an example of the present disclosure, a process of performing the protocol processing by the second member device is related to the protocol type of the first protocol packet. As an example, if the first protocol packet is an ARP protocol packet, the second member device may perform protocol processing based on the second DR interface and the ARP protocol packet. For example, the second member device may record, in a forwarding entry, a correspondence between a source address of the ARP protocol packet and the interface identifier of the second DR interface.

As another example, if the first protocol packet is an STP protocol packet, the second member device may perform protocol processing based on the second DR interface and the STP protocol packet. For example, the second member device may determine, based on the STP protocol packet, a port role of the second DR interface (for example, determining whether the second DR interface is a root port, a designated port, or a blocked port, etc.). For the determining method, a conventional STP protocol processing flow may be referred to.

Conventionally, upon performing protocol processing based on the first DR interface and the first protocol packet, the first member device will send a result of the protocol processing to the second member device through a private message. As an example, if the first protocol packet is an ARP protocol packet, the result of the protocol processing may indicate a correspondence between a source address of the ARP protocol packet and the interface identifier of the first DR interface, and the private message may carry the source address of the ARP protocol packet and the interface identifier of the first DR interface. As another example, if the first protocol packet is an STP protocol packet, the result of the protocol processing may indicate that the first DR interface is a designated port, and the private message may carry information indicating that the first DR interface is a designated port.

In contrast, in the example of the present disclosure, upon performing protocol processing based on the first DR interface and the first protocol packet, the first member device will not send the result of the protocol processing to the second member device through a private message, but may send the interface identifier of the first DR interface and the first protocol packet directly to the second member device.

The second member device may determine the second DR interface corresponding to the interface identifier, determine that the first protocol packet is received through the second DR interface, and then perform protocol processing based on the second DR interface and the first protocol packet. Thus, even if the software version of the second member device is inconsistent with that of the first member device, the second member device supporting the protocol may perform protocol processing based on the first protocol packet. Therefore, trusted and compatible version upgrade may be implemented, and abnormal link aggregation may be avoided.

The processing by the first member device upon receiving the first protocol packet through the first DR interface has been described in detail above.

In addition, in an example, upon receiving a second protocol packet through a non-DR interface, the first member device may perform protocol processing based on the non-DR interface and the second protocol packet, and determine a protocol type of the second protocol packet. If the protocol type is an entry-unrelated protocol type, the first member device may send the second protocol packet to the second member device, so that the second member device performs protocol processing based on the second protocol packet. If the protocol type is an entry-related protocol type, the first member device may not send the second protocol packet to the second member device.

As an example, upon receiving an ARP protocol packet through a non-DR interface (such as the interface 1012), the first member device may perform protocol processing based on the non-DR interface and the ARP protocol packet. Specifically, the first member device may record, in a forwarding entry, a correspondence between a source address of the ARP protocol packet and an interface identifier of the non-DR interface. Then, the first member device may determine that the protocol type of the ARP protocol packet is an entry-related protocol type, and thus the first member device may not send the ARP protocol packet to the second member device.

As another example, upon receiving an STP protocol packet through a non-DR interface, the first member device may perform protocol processing based on the non-DR interface and the STP protocol packet. Specifically, the first member device may determine, based on the STP protocol packet, a port role of the non-DR interface (for example, determining whether the non-DR interface is a root port, a designated port, or a blocked port, etc.). For the determining method, a conventional STP protocol processing flow may be referred to. Then, the first member device may determine that the protocol type of the STP protocol packet is an entry-unrelated protocol type. Thus, the first member device may send the STP protocol packet to the second member device, so that the second member device performs protocol processing based on the STP protocol packet.

As an example, if the protocol type of the second protocol packet is an entry-unrelated protocol type, the first member device may send the second protocol packet to the second member device through the RLINK, so that the second member device performs protocol processing based on the second protocol packet.

For example, referring to FIG. 1, assuming that the network device 101 is the first member device and the network device 102 is the second member device, upon receiving an STP protocol packet through the interface 1012 (that is, a non-DR interface), the network device 101 may send the STP protocol packet to the network device 102 through the RLINK. Upon receiving the STP protocol packet, the network device 102 may perform protocol processing based on the STP protocol packet.

Since the network device 101 and the network device 102 are aggregated, through an Ethernet link, into a DR system acting externally as one network device, the network device 102 and the network device 101 may act externally as one network device, and the interface 1012 may also be regarded as a non-DR interface of the network device 102. Upon receiving the STP protocol packet from the network device 101 through the RLINK, the network device 102 may consider that the STP protocol packet is received through the non-DR interface 1012 of the network device 102. Therefore, the network device 102 may determine, based on the STP protocol packet, a port role of the interface 1012 (for example, determining whether the interface 1012 is a root port, a designated port, or a blocked port, etc.). For the determining method, a conventional STP protocol processing flow may be referred to.

As another example, if the protocol type of the second protocol packet is an entry-unrelated protocol type, the first member device may send a second type packet to the second member device through the RLINK. The second type packet may include an interface identifier of the non-DR interface and the second protocol packet, so that the second member device performs protocol processing based on the non-DR interface corresponding to the interface identifier and the second protocol packet.

Specifically, the second type packet may comprise a header and a packet body. The header may include the interface identifier of the non-DR interface, and the packet body may include the second protocol packet. For example, the header may be in a TLV format, where a Type field may include a first identifier indicating that the header carries the interface identifier of the non-DR interface; a Length field may include a value of a length of the header; and a Value field may include the interface identifier of the non-DR interface. The packet body may also be in a TLV format, where a Type field may include a second identifier indicating that the packet body carries a protocol packet body; a Length field may include a value of a length of the packet body; and a Value field may include the second protocol packet.

For example, referring to FIG. 1, assuming that the network device 101 is the first member device and the network device 102 is the second member device, upon receiving an STP protocol packet through the interface 1012 (that is, a non-DR interface), the network device 101 may construct a second type packet comprising an interface identifier of the interface 1012 and the STP protocol packet, and may send the second type packet to the network device 102 through the RLINK.

Upon receiving the second type packet, the network device 102 may obtain the interface identifier of the interface 1012 and the STP protocol packet from the second type packet, and may perform protocol processing based on the non-DR interface corresponding to the interface identifier and the STP protocol packet. Specifically, based on the obtained interface identifier of the interface 1012, the network device 102 may determine that the STP protocol packet is received through the interface 1012. Therefore, the network device 102 may determine, based on the STP protocol packet, a port role of the interface 1012 (for example, determining whether the interface 1012 is a root port, a designated port, or a blocked port, etc.). For the determining method, a conventional STP protocol processing flow may be referred to.

Conventionally, upon performing protocol processing based on the non-DR interface and the second protocol packet, the first member device will send a result of the protocol processing to the second member device through a private message. In contrast, in an example of the present disclosure, after the first member device performs protocol processing based on the non-DR interface and the second protocol packet, if the protocol type of the second protocol packet is an entry-unrelated protocol type, the first member device will not send the result of the protocol processing to the second member device through a private message, but may send the second protocol packet directly to the second member device, so that the second member device performs protocol processing based on the second protocol packet. Thus, even if the software version of the second member device is inconsistent with that of the first member device, the second member device supporting the protocol may perform protocol processing based on the second protocol packet. Therefore, trusted and compatible version upgrade may be implemented, and abnormal link aggregation may be avoided.

In addition, in an example, since the first member device and the second member device may act externally as one network device after link aggregation, only one of the first member device and the second member is required to send an STP protocol packet to an external device in order to implement the STP protocol, and the other member device does not need to send an STP protocol packet to the external device.

In order to determine which member device is required to send an STP protocol packet to the external device, a STP role of the first member device and a STP role of the second member device may be determined. If it is determined that the STP role of the first member device is a master role and the STP role of the second member device is a standby role, it may be determined that the first member device is required to send an STP protocol packet to the external device. If it is determined that the STP role of the second member device is a master role and the STP role of the first member device is a standby role, it may be determined that the second member device is required to send an STP protocol packet to the external device.

Conventionally, the respective STP roles of the first and second member devices are configured by a user. For example, the user may configure the first member device as a master role and the second member device as a standby role.

In contrast, in an example of the present disclosure, the first member device and the second member device may send an STP protocol packet to each other. The first member device may determine its STP role based on the STP protocol packet sent by the second member device. The second member device may determine its STP role based on the STP protocol packet sent by the first member device. For example, the first member device may send STP protocol packet 1 to the second member device through the first IPP, and the second member device may determine its STP role based on STP protocol packet 1. In addition, the second member device may send STP protocol packet 2 to the first member device through the second IPP, and the first member device may determine its STP role based on STP protocol packet 2.

If the first member device receives, through the first IPP, STP protocol packet 2 sent by the second member device, the first member device may determine its STP role based on STP protocol packet 2. If it is determined that the STP role of the first member device is the master role, the first member device may send STP protocol packet 3 to an external device through the first DR interface, and STP protocol packet 3 may comprise the MAC address of the first member device, the priority of the first member device and the like, so that the external device performs protocol processing based on STP protocol packet 3. If it is determined that the STP role of the first member device is the standby role, the first member device may prohibit sending an STP protocol packet to the external device through the first DR interface. Here, after the first member device receives, through the first IPP, STP protocol packet 2 sent by the second member device, the first member device may prohibit performing protocol processing based on STP protocol packet 2 and the first IPP, that is, not to determine, based on STP protocol packet 2, a port role of the first IPP (such as a root port, a designated port, or a blocked port, etc.).

For example, STP protocol packet 2 received by the first member device from the second member device may comprise the MAC address, the priority and the like of the second member device. The first member device may obtain the priority of the second member device from STP protocol packet 2, and may determine its STP role based on the priority of the first member device and the priority of the second member device. For example, if the priority of the first member device is higher than the priority of the second member device, the first member device may determine that its STP role is the master role; if the priority of the second member device is higher than the priority of the first member device, the first member device may determine that its STP role is the standby role.

In an example, if the second member device receives, through the second IPP, STP protocol packet 1 sent by the first member device, the second member device may determine its STP role based on STP protocol packet 1. If it is determined that the STP role of the second member device is the master role, the second member device may send STP protocol packet 4 to the external device through the second DR interface, and STP protocol packet 4 may comprise the MAC address of the second member device, the priority of the second member device and the like, so that the external device performs protocol processing based on STP protocol packet 4. If it is determined that the STP role of the second member device is the standby role, the second member device may prohibit sending an STP protocol packet to the external device through the second DR interface. Here, after the second member device receives, through the second IPP, STP protocol packet 1 sent by the first member device, the second member device may prohibit performing protocol processing based on STP protocol packet 1 and the second IPP.

If STP protocol packet 1 received by the second member device from the first member device comprises the priority of the first member device, the second member device may determine its STP role based on the priority of the first member device and the priority of the second member device. For example, if the priority of the first member device is higher than the priority of the second member device, the second member device may determine that its STP role is the standby role; and if the priority of the second member device is higher than the priority of the first member device, the second member device may determine that its STP role is the master role.

In summary, if it is determined that the STP role of the first member device is a master role and the STP role of the second member device is a standby role, the first member device may send STP protocol packet 3 to an external device through the first DR interface, and the second member device does not send an STP protocol packet to the external device through the second DR interface. If it is determined that the STP role of the first member device is a standby role and the STP role of the second member device is a master role, the second member device may send STP protocol packet 4 to the external device through the second DR interface, and the first member device does not send an STP protocol packet to the external device through the first DR interface. Therefore, the external device will receive either the STP protocol packet sent by the first member device or that sent by the second member device, and may not receive both the STP protocol packet sent by the first member device and that sent by the second member device, thereby ensuring correct STP protocol processing.

In the above examples, the first member device may periodically send STP protocol packet 1 to the second member device through the first IPP, or the first member device may send STP protocol packet 1 to the second member device through the first IPP when STP protocol information such as the priority, the MAC address or the like of the first member device changes. Similarly, the second member device may periodically send STP protocol packet 2 to the first member device through the second IPP, or the second member device may send STP protocol packet 2 to the first member device through the second IPP when STP protocol information such as the priority, the MAC address or the like of the second member device changes.

Figure 3:
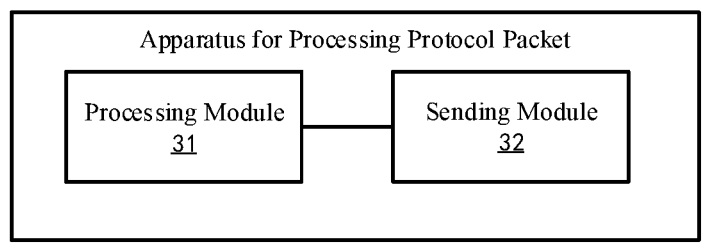
FIG. 3 is a block diagram of an apparatus for processing a protocol packet based on an example of the present disclosure.

An example of the present disclosure also provides an apparatus for processing a protocol packet. The apparatus may be applied to a first member device of a DR system, and the DR system further comprises a second member device. FIG. 3 is a block diagram of the apparatus for processing a protocol packet. As shown in FIG. 3, the apparatus may comprise a processing module 31 and a sending module 32.

The processing module 31 may, upon receiving a first protocol packet through a first DR interface, perform protocol processing based on the first DR interface and the first protocol packet. The sending module 32 may send a first type packet to the second member device, where the first protocol packet may include an interface identifier of the first DR interface and the first protocol packet, so that the second member device determines that the first protocol packet is received through a second DR interface corresponding to the interface identifier, and performs protocol processing based on the second DR interface and the first protocol packet.

Optionally, upon receiving a second protocol packet through a non-DR interface, the processing module 31 may perform protocol processing based on the non-DR interface and the second protocol packet, and may determine a protocol type of the second protocol packet. If the protocol type is an entry-unrelated protocol type, the sending module 32 may send the second protocol packet to the second member device, so that the second member device performs protocol processing based on the second protocol packet. For example, the sending module 32 may send a second type packet to the second member device, where the second type packet comprises an interface identifier of the non-DR interface and the second protocol packet, so that the second member device performs protocol processing based on the non-DR interface corresponding to the interface identifier and the second protocol packet.

Optionally, upon receiving, through an IPP, a first STP protocol packet sent by the second member device, the processing module 31 may determine a STP role of the first member device based on the first STP protocol packet. If it is determined that the STP role is a master role, the sending module 32 may send a second STP protocol packet to an external device through the first DR interface, where the second STP protocol packet may comprise a MAC address of the first member device, so that the external device performs protocol processing based on the second STP protocol packet. If it is determined that the STP role is a standby role, the sending module 32 may prohibit sending a second STP protocol packet to an external device through the first DR interface.

Optionally, upon receiving, through the IPP, the first STP protocol packet sent by the second member device, the processing module 31 may also prohibit performing protocol processing based on the first STP protocol packet and the IPP.

Optionally, if the first STP protocol packet comprises the priority of the second member device, the processing module 31 may determine the STP role of the first member device based on the priority of the first member device and the priority of the second member device.

Figure 4:
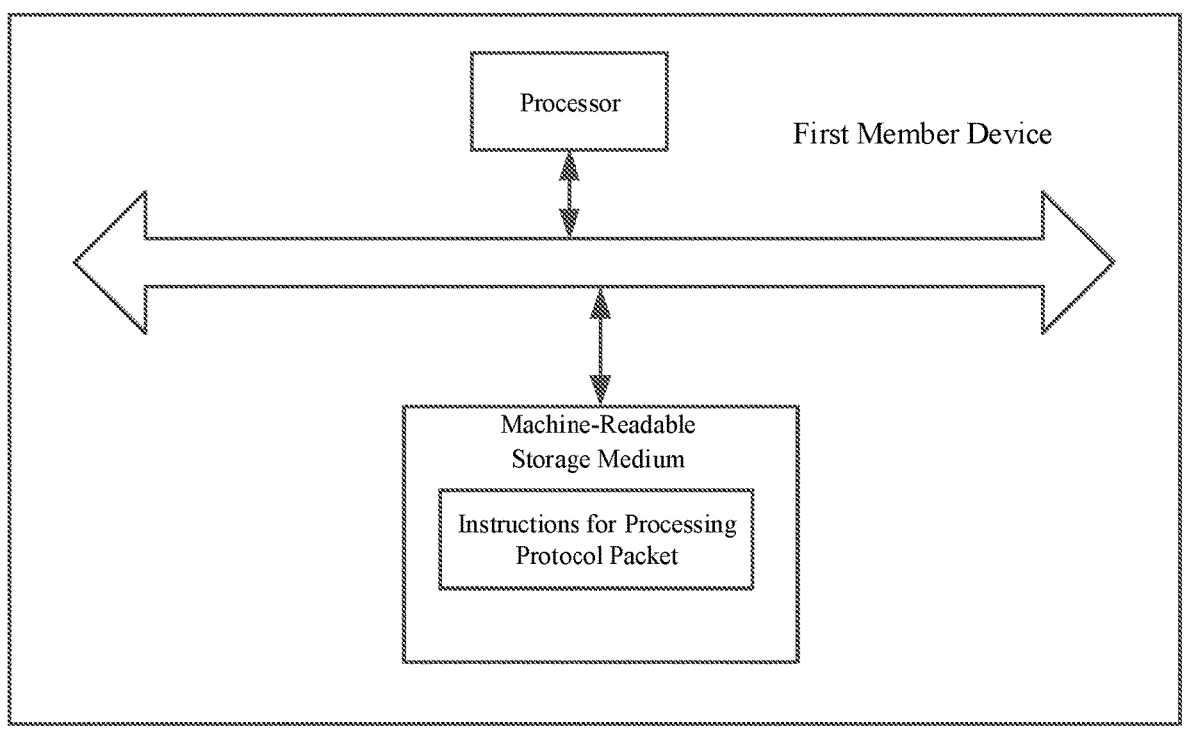
FIG. 4 is a block diagram of a first member device based on an example of the present disclosure.

In an example of the present disclosure, a first member device may comprise a machine-readable storage medium and a processor, as shown in FIG. 4. The machine-readable storage medium may store instructions for processing a protocol packet. The processor may communicate with the machine-readable storage medium to read and execute the instructions stored in the machine-readable storage medium to implement a method of processing a protocol packet based on any of the above examples of the present disclosure.

The machine-readable storage medium may be an electronic, magnetic, optical or other physical storage device, and may contain or store information such as executable instructions, data or the like. For example, the machine-readable storage medium may comprise a volatile memory (for example, a Random Access Memory (RAM)), a non-volatile memory (for example, a flash memory, a storage drive (such as a hard disk drive), a solid state drive (SSD), an optical storage (for example, a Compact Disc Read-Only Memory (CD-ROM), a Digital Versatile Disc (DVD), etc.) or a combination thereof.

A system, a device, a module or a unit described in the above examples may be implemented by a computer chip or an entity, or by a product having a certain function. A typical implementing device is an electronic device, including but not limited to: a personal computer, a laptop computer, a tablet computer, a cellular phone, a camera, a smart phone, a personal digital assistant (PDA), a media player, a navigation device, an e-mail transceiver, a game console, a wearable device, or any combination thereof.

For convenience of description, a device may be described in terms of respective functional units thereof. Of course, when implementing the present disclosure, the functions of the respective units unit may be implemented in the same or multiple software and/or hardware.

Those skilled in the art could appreciate that any of the examples of the present disclosure may be provided as a method, a system, or a computer program product. Therefore, the present disclosure may be implemented in an entire hardware example, an entire software example, or an example combining a software aspect with a hardware aspect.

The present disclosure is described with reference to a flowchart and/or a block diagram of a method, an apparatus (a system) and/or a computer program product based on the examples of the present disclosure. It could be appreciated that each block of the flowchart and/or the block diagram may be implemented by computer program instructions. These computer program instructions may be provided to a processor of a general-purpose computer, a special-purpose computer, an embedded processing device, or any other programmable data processing device, so that the computer program instructions, when executed by the processor, may generate means for implementing respective functions specified in one or more blocks of the flowchart and/or the block diagram.

Some examples of the present disclosure are described above and are not intended to limit the present disclosure. Those skilled in the art could contemplate that the present disclosure may be variously modified and changed. Any modification, equivalent replacement, improvement or the like based on the spirit and principles of the present disclosure is intended to be included in the scope of the appended claims.

The invention claimed is:

1. A method of processing a protocol packet, the method being performed by a first member device of a distributed relay (DR) system which further comprises a second member device, and the method comprising:
  upon receiving a first protocol packet through a first DR interface, performing protocol processing based on the first DR interface and the first protocol packet; and
  sending, to the second member device, a first type packet comprising an interface identifier of the first DR interface and the first protocol packet, so that the second member device determines that the first protocol packet is received through a second DR interface corresponding to the interface identifier, and performs protocol processing based on the second DR interface and the first protocol packet,
  upon receiving a second protocol packet through a non-DR interface, performing protocol processing based on the non-DR interface and the second protocol packet, and determining a protocol type of the second protocol packet; and
  when the protocol type is an entry-unrelated protocol type, sending the second protocol packet to the second member device, so that the second member device performs protocol processing based on the second protocol packet.

2. The method according to claim 1, wherein the sending of the second protocol packet to the second member device comprises:
  sending, to the second member device, a second type packet comprising an interface identifier of the non-DR interface and the second protocol packet, so that the second member device performs protocol processing based on the non-DR interface corresponding to the interface identifier of the non-DR interface and the second protocol packet.

3. The method according to claim 1, further comprising:
  when a first spanning tree protocol packet sent by the second member device is received through an intra-portal port, determining an STP role of the first member device based on the first STP protocol packet; and
  in response to determining that the STP role is a master role, sending a second STP protocol packet, which comprises a media access control address of the first member device, to an external device through the first DR interface, so that the external device performs protocol processing based on the second STP protocol packet.

4. The method according to claim 3, wherein
  when the first STP protocol packet sent by the second member device is received through the IPP, prohibiting performing protocol processing based on the first STP protocol packet and the IPP.

5. The method according to claim 4, wherein
the first STP protocol packet comprises a priority of the second member device; and
the determining of the STP role of the first member device comprises: determining the STP role of the first member device based on a priority of the first member device and the priority of the second member device.

6. The method according to claim 3, wherein
in response to determining that the STP role is a standby role, prohibiting sending the second STP protocol packet to the external device through the first DR interface.

7. The method according to claim 6, wherein
the first STP protocol packet comprises a priority of the second member device; and
the determining of the STP role of the first member device comprises: determining the STP role of the first member device based on a priority of the first member device and the priority of the second member device.

8. The method according to claim 3, wherein
the first STP protocol packet comprises a priority of the second member device; and
the determining of the STP role of the first member device comprises: determining the STP role of the first member device based on a priority of the first member device and the priority of the second member device.

9. A member device of a DR system, the member device comprising:
a processor; and
a machine-readable storage medium storing therein instructions for processing a protocol packet that, when executed by the processor, cause the processor to:
upon receiving a first protocol packet through a first DR interface, perform protocol processing based on the first DR interface and the first protocol packet; and
send, to another member device of the DR system, a first type packet comprising an interface identifier of the first DR interface and the first protocol packet, so that the another member device determines that the first protocol packet is received through a second DR interface corresponding to the interface identifier, and performs protocol processing based on the second DR interface and the first protocol packet,
upon receiving a second protocol packet through a non-DR interface, perform protocol processing based on the non-DR interface and the second protocol packet, and determining a protocol type of the second protocol packet; and
when the protocol type is an entry-unrelated protocol type, send the second protocol packet to the second member device, so that the second member device performs protocol processing based on the second protocol packet.

10. The member device according to claim 9,
sending, to the second member device, a second type packet comprising an interface identifier of the non-DR interface and the second protocol packet, so that the second member device performs protocol processing based on the non-DR interface corresponding to the interface identifier of the non-DR interface and the second protocol packet.

11. The member device according to claim 10, further comprising:
when a first spanning tree protocol packet sent by the second member device is received through an intra-portal port, determining an STP role of the first member device based on the first STP protocol packet; and
in response to determining that the STP role is a master role, sending a second STP protocol packet, which comprises a media access control address of the first member device, to an external device through the first DR interface, so that the external device performs protocol processing based on the second STP protocol packet.

12. The member device according to claim 9, wherein
when the first STP protocol packet sent by the second member device is received through the IPP, prohibiting performing protocol processing based on the first STP protocol packet and the IPP.

13. The member device according to claim 12, wherein
in response to determining that the STP role is a standby role, prohibiting sending the second STP protocol packet to the external device through the first DR interface.

14. The member device according to claim 13, wherein
the first STP protocol packet comprises a priority of the second member device; and
the determining of the STP role of the first member device comprises: determining the STP role of the first member device based on a priority of the first member device and the priority of the second member device.

15. The member device according to claim 12, wherein
the first STP protocol packet comprises a priority of the second member device; and
the determining of the STP role of the first member device comprises: determining the STP role of the first member device based on a priority of the first member device and the priority of the second member device.

16. The member device according to claim 15, wherein
the first STP protocol packet comprises a priority of the second member device; and
the determining of the STP role of the first member device comprises: determining the STP role of the first member device based on a priority of the first member device and the priority of the second member device.

* * * * *